US010101156B2

(12) United States Patent
Li et al.

(10) Patent No.: US 10,101,156 B2
(45) Date of Patent: Oct. 16, 2018

(54) METHOD AND APPARATUS FOR DETERMINING SPATIAL PARAMETER BASED ON IMAGE AND TERMINAL DEVICE

(71) Applicant: Xiaomi Inc., Beijing (CN)

(72) Inventors: Guosheng Li, Beijing (CN); Anyu Liu, Beijing (CN); Lin Liu, Beijing (CN)

(73) Assignee: Xiaomi, Inc., Beijing (CN)

( * ) Notice: Subject to any disclaimer, the term of this patent is extended or adjusted under 35 U.S.C. 154(b) by 197 days.

(21) Appl. No.: 15/149,960

(22) Filed: May 9, 2016

(65) Prior Publication Data

US 2017/0023362 A1 Jan. 26, 2017

(30) Foreign Application Priority Data

Jul. 20, 2015 (CN) .......................... 2015 1 0429062

(51) Int. Cl.
  *G06K 9/00* (2006.01)
  *G01C 11/30* (2006.01)
  *G01B 11/02* (2006.01)
(52) U.S. Cl.
  CPC .............. *G01C 11/30* (2013.01); *G01B 11/02* (2013.01); *G01B 11/022* (2013.01); *G01B 11/026* (2013.01)
(58) Field of Classification Search
  CPC ..... G01B 11/022; G01B 11/026; G01B 11/02; G01C 11/30; G01C 3/00; G06T 7/60; G06T 7/62
  See application file for complete search history.

(56) References Cited

U.S. PATENT DOCUMENTS 9,605,944 B2 * 3/2017 Yamanaka ........... G01B 11/026
2008/0018754 A1  1/2008 Ejima et al.
(Continued)

FOREIGN PATENT DOCUMENTS

CN    1430072 A    7/2003
CN    101183206 A   5/2008
(Continued)

OTHER PUBLICATIONS

English Translation of International Search Report dated Apr. 22, 2016 for International Application No. PCT/CN2015/098853, 6 pages.

(Continued)

Primary Examiner — Yon Couso
(74) Attorney, Agent, or Firm — Brinks, Gilson & Lione

(57) ABSTRACT

A method for determining a spatial parameter for an object displayed on a device includes determining a first pixel coordinate corresponding to a first point of an image of the object and a second pixel coordinate corresponding to a second point of an image of the object displayed on the device, determining an image distance between the first pixel coordinate and the second pixel coordinate, and determining a spatial parameter for the object based on a distance between an imaging element of the device and the object, and a focal length of a lens of the imaging element for photographing the object. According to the technical solution of the present disclosure, the real size of the photographed object can be quantized based on the image, without having to illustrating the real size of the photographed object in contrast with a reference object placed in the image, thereby improving the user experience.

10 Claims, 5 Drawing Sheets

(56) References Cited

U.S. PATENT DOCUMENTS

| | | |
|---|---|---|
| 2012/0224052 A1 | 9/2012 | Bae |
| 2013/0034270 A1 | 2/2013 | Masuda et al. |
| 2013/0287255 A1 | 10/2013 | Ahn et al. |
| 2014/0029806 A1 | 1/2014 | Nihei et al. |
| 2014/0300722 A1 | 10/2014 | Garcia |
| 2017/0069109 A1* | 3/2017 | Pepelka ............ G01B 11/02 |

FOREIGN PATENT DOCUMENTS

| | | |
|---|---|---|
| CN | 101813946 A | 8/2010 |
| CN | 201977794 U | 9/2011 |
| CN | 103149566 A | 6/2013 |
| CN | 104331896 A | 2/2015 |
| CN | 104720814 A | 6/2015 |
| JP | 2001-209827 A | 8/2001 |
| JP | 2004-205222 A | 7/2004 |
| JP | 2004-219255 A | 8/2004 |
| JP | 2013-207745 A | 10/2013 |
| JP | 2013-251656 A | 12/2013 |
| KR | 10-2011-0030239 A | 3/2011 |
| KR | 10-1074678 B1 | 10/2011 |
| RU | 100 228 U1 | 12/2010 |
| RU | 2 452 992 C1 | 6/2012 |

OTHER PUBLICATIONS

Office Action dated Sep. 5, 2017 for Japanese Application No. 2017-529132, 5 pages.

Office Action dated Jan. 31, 2017 for Korean Application No. 10-2016-7004788, 5 pages.

Office Action dated Aug. 17, 2017 for Korean Application No. 10-2016-7004788, 6 pages.

Office Action dated Jun. 28, 2017 for Russian Application No. 2016118756/08, 14 pages.

International Search Report dated Apr. 22, 2016 for International Application No. PCT/CN2015/098853, 5 pages.

Office Action dated Jan. 16, 2018 for Japanese Application No. 2017-529132, 2 pages.

* cited by examiner

METHOD AND APPARATUS FOR DETERMINING SPATIAL PARAMETER BASED ON IMAGE AND TERMINAL DEVICE

CROSS-REFERENCE TO RELATED APPLICATIONS

This application is based on and claims priority to Chinese Patent Application No. 201510429062.9, filed on Jul. 20, 2015, the entire contents of which are incorporated herein by reference.

TECHNICAL FIELD

The present disclosure relates to the field of the image processing technology, and more particularly, to a method and an apparatus for determining a spatial parameter based on an image, as well as a terminal device.

BACKGROUND

When the size of an object in an image is illustrated by means of the image, a reference object needs to be placed in a scene where the image is photographed. For example, a piece of A4 paper is used as the reference object to be contrasted with an air purifier so that a viewer may have an intuitive cognition of the size of the air purifier. However, objects may be photographed at different distances and thus the photographed objects may occupy different numbers of pixel points on an image sensor of a camera. Therefore, it is unable to conveniently learn about the real size of the photographed object by means of the reference object t in the image.

SUMMARY

Embodiments of the present disclosure provide a method and an apparatus for determining a spatial parameter based on an image and a terminal device, which are used to conveniently determine a real size of a photographed object in an image based on the image.

According to a first aspect of the embodiments of the present disclosure, a method for determining a spatial parameter for an object displayed on a device is provided. The method includes determining a first pixel coordinate corresponding to a first point of an image of the object displayed on the device and a second pixel coordinate corresponding to a second point of the image displayed on the device, determining an image distance between the first pixel coordinate and the second pixel coordinate, and determining a spatial parameter for the object point based on the image distance, a distance between an imaging element of the device and the object, and a focal length of a lens of the imaging element for photographing the image.

According to a second aspect of the embodiments of the present disclosure, an apparatus for determining a spatial parameter for an object displayed on a display device is provided. The apparatus includes a first determining module configured to determine a first pixel coordinate corresponding to a first point of an image of the object and a second pixel coordinate corresponding to a second point of the image displayed on the display device, a second determining module configured to determine an image distance between the first pixel coordinate and the second pixel coordinate determined by the first determining module, and a third determining module configured to determine a spatial parameter for the object based on the image distance, a distance between an imaging element of the terminal device and the object, and a focal length of a lens of the imaging element for photographing the object.

According to a third aspect of the embodiments of the present disclosure, a terminal device is provided, including a processor, and a memory configured to store instructions executable by the processor. The processor is configured to determine a first pixel coordinate corresponding to a first point of an image of an object and a second pixel coordinate corresponding to a second point of the image displayed on a display device, determine an image distance between the first pixel coordinate and the second pixel coordinate, and determine a spatial parameter for the object based on the image distance, a distance between an imaging element of the terminal device and the object, and a focal length of a lens of the imaging element for photographing the object.

It is to be understood that both the foregoing general description and the following detailed description are exemplary and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
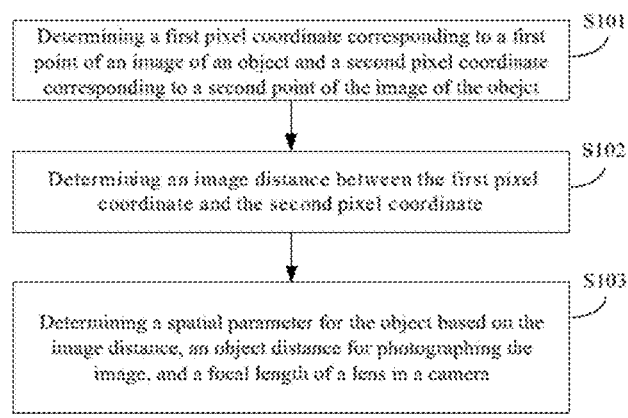
FIG. 1A is a flowchart illustrating a method for determining a spatial parameter by means of an image according to an exemplary embodiment.
Figure 1B:
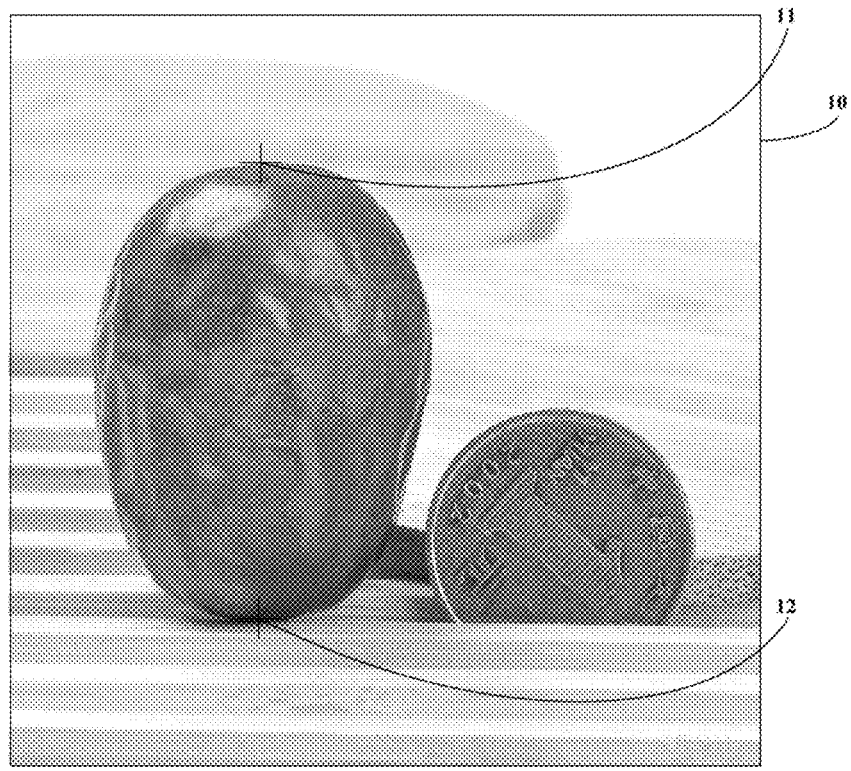
FIG. 1B is a schematic diagram illustrating a first pixel coordinate and a second pixel coordinate on an image according to an exemplary embodiment.
Figure 1C:
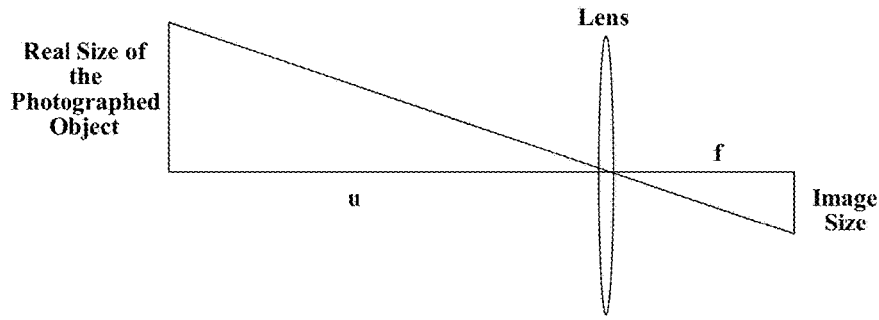
FIG. 1C is a schematic diagram illustrating imaging according to an exemplary embodiment.

FIG. 1A is a flowchart illustrating a method for determining a spatial parameter by means of an image according to an exemplary embodiment, FIG. 1B is a schematic diagram illustrating a first pixel coordinate and a second pixel coordinate on the image according to an exemplary embodiment, and FIG. 1C is a schematic diagram illustrating an example of imaging according to an exemplary embodiment. The method for determining a spatial parameter by means of an image may be applied to a terminal device having a display function (for example, a smart mobile phone, a tablet computer, a desktop computer or the like), and may be implemented by installing an application on the terminal device or installing software on a desktop computer. As shown in FIG. 1A, the method for determining a spatial parameter by means of an image includes the following steps S101-S103.

In Step S101, a first pixel coordinate corresponding to a first point of an image of an object displayed on the display device and a second pixel coordinate corresponding to a second point of the image are determined.

In an embodiment, as shown in FIG. 1B, when an image 10 is displayed on the display device, a pixel coordinate on the image to be selected by a user can be determined by monitoring a location of the user's touch point on a touch screen and converting the location of the touch point into the pixel coordinate on the image. In another embodiment, when the image 10 is displayed on the display device, a pixel coordinate on the image to be selected by the user can be determined by monitoring a click location of a mouse and converting the click location of the mouse into the pixel coordinate on the image.

In an embodiment, the first pixel coordinate and the second pixel coordinate may correspond to edge locations (for example, two ends of a date as shown in FIG. 1B) of a photographed object in the image, thus a real dimensional size of the object in the image may be determined based on the first pixel coordinate and the second pixel coordinate. In another embodiment, the first pixel coordinate and the second pixel coordinate may correspond to central locations of two objects in an image, respectively, thus a real distance between the two objects may be determined based on the first pixel coordinate and the second pixel coordinate. As shown in FIG. 1B, a first endpoint 11 of the date in the image 10 corresponds to the first pixel coordinate, and a second endpoint 12 thereof corresponds to the second pixel coordinate.

In Step S102, an image distance between the first pixel coordinate and the second pixel coordinate is determined.

In an embodiment, the first pixel coordinate is [a1, b1], the second pixel coordinate is [a2, b2], and the image distance between the first pixel coordinate and the second pixel coordinate may be $d=\sqrt{(a1-a2)^2+(b1-b2)^2}$.

In Step S103, a spatial parameter for the object is determined according to the image distance, an object distance for photographing the image and a focal length of a lens in a camera for photographing the image. The object distance for photographing the image is a distance between the object and the lens in the camera.

In an embodiment, as shown in FIG. 1C, after the image distance between the first pixel coordinate and the second pixel coordinate is determined, an imaging size of the object may be determined according to the physical size of the pixel in the image sensor of a camera, and the real spatial parameter of the photographed object in the image may further be determined based on a similarity relation of similar triangles as shown in FIG. 1C:

$$\frac{\text{Real size of the photographed object}}{u} = \frac{\text{Image size}}{f},$$

where u is indicative of the object distance and f is indicative of the focal length. In an embodiment, the spatial parameter may be the real size of the photographed object. In another embodiment, the spatial parameter may be a real distance in a captured scene. The spatial parameter should not be limited by the present disclosure as long as the real distance between the first pixel coordinate and the second pixel coordinate can be determined according to the first pixel coordinate and the second pixel coordinate.

In an exemplary scene, a vendor sells the date as shown in FIG. 1B. In related art, the vendor may need a coin to illustrate the size of the date by contrast in the image 10. According to the present disclosure, however, the real size of the date may be learned by a buyer shopping online based on the first pixel coordinate 11 and the second pixel coordinate 12 in FIG. 1B, for example, by reading information such as the focal length of the lens for photographing the image, the physical size of the pixel in the image sensor of the camera apparatus, and the object distance upon photographing the image.

In this embodiment, by determining the first pixel coordinate and the second pixel coordinate on the image displayed on the display device, the real size of the photographed object to be measured in the image can be acquired, and the spatial parameter of the photographed object in the image can be conveniently determined according to the image on the display device. Thus, the real size of the photographed object is measure based on the image, without illustrating the real size of the photographed object in contrast with a reference object provided in the image, thereby improving the user experience.

In an embodiment, the image distance between the first pixel coordinate and the second pixel coordinate may be determined by determining a pixel distance between the first pixel coordinate and the second pixel coordinate, determining a physical size of a pixel for an image sensor of a camera apparatus, and determining the image distance between the first pixel coordinate and the second pixel coordinate according to the pixel distance and the physical size of the pixel.

In an embodiment, the method may further include steps of determining a picture format of the image when the camera apparatus for photographing the image is not provided on the display device, and determining, from an information header of the image according to the picture format, the object distance for photographing the image, the focal length of the lens in the camera apparatus for photographing the image, and the physical size of the pixel of the image sensor of the camera apparatus.

In an embodiment, the method may further include steps of determining the object distance for photographing the image when the camera apparatus for photographing the image is provided on the display device, and writing, in a defined picture format, the object distance for photographing the image, the focal length of the lens in the camera apparatus and the physical size of the pixel in the image sensor of the camera apparatus into an information header of the image.

In an embodiment, the object distance for photographing the image can be determined by determining a time span between transmission and reception of infrared light by means of an infrared apparatus provided on the display device, and determining the object distance based on the time span and a wavelength of the infrared light.

In an embodiment, the method may further include steps of displaying, on the display device, the first pixel coordinate and the second pixel coordinate in a preset shape, and generating a prompt about whether to adjust the first pixel coordinate and the second pixel coordinate.

Subsequent embodiments are described on how to determine the spatial parameter based on the image.

Thus, according to the foregoing method provided by the present disclosure, the spatial parameter of the photographed object in the image can be conveniently determined based on the image on the display device, and the real size of the photographed object can be measured based on the image, without having to illustrate the real size of the photographed object in contrast with a reference object placed in the image, thereby improving the user experience.

The technical solution provided by the embodiments of the present disclosure will be illustrated with specific embodiments hereinafter.

Figure 2:
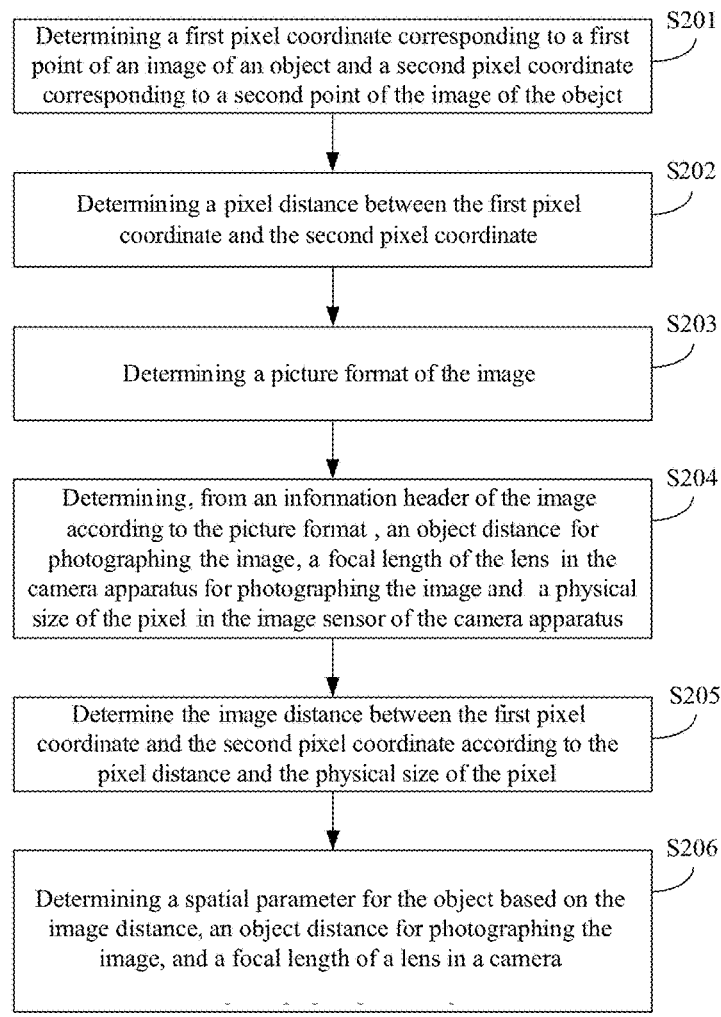
FIG. 2 is a flowchart illustrating a method for determining a spatial parameter by means of an image according to an exemplary embodiment I.

FIG. 2 is a flowchart illustrating a method for determining a spatial parameter based on an image according to an exemplary embodiment I. In this embodiment, an exemplary description of the foregoing method provided by the embodiments of the present disclosure is made with reference to FIG. 1B by taking an example in which the camera apparatus for photographing the image is not disposed on the display device. As shown in FIG. 2, the method includes the following steps.

In Step S201, a first pixel coordinate corresponding to a first point on an image displayed on the display device and a second pixel coordinate corresponding to a second point on the image are determined.

In an embodiment, the first pixel coordinate and the second pixel coordinate can be displayed on the display device in a preset shape ("+" as shown in FIG. 1B), a prompt can be generated about whether to adjust the first pixel coordinate and the second pixel coordinate. For example, when a user of the terminal device intends to measure the size of the date, the first pixel coordinate and the second pixel coordinate may be located at edges of the date. In an embodiment, edge detection is performed on the image 10 by implementing, for example, image recognition, and it is determined whether the first pixel coordinate and the second pixel coordinate are located at the edge of the photographed object (for example, the date as shown in FIG. 1B). If the first pixel coordinate or the second pixel coordinate is not located at the edge of the photographed object, the user can be prompted by a flickering "+" to adjust the first pixel coordinate or the second pixel coordinate. In this way, the edge of the photographed object can be indicated more accurately by the first pixel coordinate and the second pixel coordinate, and thus the image distance of the photographed object on the image can be further determined accurately. For another example, when the user of the terminal device intends to measure the distance between two photographed objects (a first photographed object and a second photographed object), the first pixel coordinate and the second pixel coordinate may be respectively located in the center of the first photographed object and of the second photographed object. In an embodiment, edge detection is performed on the image (not shown in the figure) including the first photographed object and the second photographed object, and it is determined whether the first pixel coordinate and the second pixel coordinate are located in the center of the first photographed object and of the second photographed object. If the first pixel coordinate or the second pixel coordinate is not located in the center of the photographed object, the user can be prompted by a flickering "+" to adjust the first pixel coordinate and/or the second pixel coordinate. In this way, the center of the photographed object can be indicated more accurately by the first pixel coordinate and the second pixel coordinate, and thus the image distance between the center of the first photographed object and that of the second photographed object on the image can be determined accurately.

In Step S202, a pixel distance between the first pixel coordinate and the second pixel coordinate is determined. Description of the Step S202 may be referred to the description of the foregoing Step S102, which is not detailed herein.

In Step S203, a picture format of the image is determined. In an embodiment, the picture format of the image is determined based on format information written into the image 10.

In Step S204, an object distance upon photographing the image, a focal length of a lens in a camera apparatus for photographing the image, and a physical size of a pixel in an image sensor of the camera apparatus are determined from an information header of the image according to the picture format.

In Step S205, the image distance between the first pixel coordinate and the second pixel coordinate is determined according to the pixel distance and the physical size of the pixel. As described above, an image distance is a distance between two points on an image. A pixel distance is a distance between two pixels of an image sensor of a camera.

In Step S204 and Step S205, for example, when the physical size of the pixel of the image sensor of the camera apparatus is 1 μm (merely as an exemplary description) and the image distance between the first pixel coordinate 11 and the second pixel coordinate 12 as shown in FIG. 1B is 100 pixels, the image distance between the first pixel coordinate 11 and the second pixel coordinate 12 is 1*100=100 μm.

In Step S206, a spatial parameter for the object, for example an actual distance between the first point and the second point, is determined according to the image distance, the object distance upon photographing the image and the focal length of the lens in the camera apparatus for photographing the image. Description of the Step S206 may be referred to the description of the foregoing Step S103, which is not detailed herein. The spatial parameter for the object such as an actual length, width, or height of the object may be displayed on a device along with the image of the object. In other embodiment, an actual distance between two objects in an image, for example, an actual distance between two buildings captured in an image may be displayed on the image.

In an exemplary scene, after the image 10 is photographed by a terminal device A with the camera apparatus disposed thereon, the focal length of the lens in the camera apparatus, the physical size of the pixel of the image sensor of the camera apparatus and the object distance for photographing the image 10 are written into the information header of the image 10, and the image is stored in a defined picture format. Afterwards, the terminal device A may upload the image 10 to an e-commerce platform, so that the photographed commodity "date" is displayed on the e-commerce platform. When a user of a terminal device B views the image 10 via the e-commerce platform and intends to learn about the real size of the "date" in the image 10, the image 10 is stored into a storage module of the terminal device B and, according to the present disclosure, edge coordinates of the date: the first pixel coordinate 11 and the second pixel coordinate 12 are determined. Then, relevant parameters (for example, the focal length of the lens in the camera apparatus, the physical size of the pixel in the image sensor of the camera apparatus and the object distance for photographing the date) applied by the terminal device A upon photographing the image 10 are read from the image 10, and the real size of the date can be further determined. The real size of the date may be displayed on the terminal device B along with the image of the date. In this way, the user of the terminal device B can be avoided from learning the real size of the date by contrast with the coin in the image 10, and the user experience of the terminal device B can be improved.

In this embodiment, when the camera apparatus for photographing the image is not disposed on the display device, the real spatial parameter of the photographed object in the image can be conveniently learned at another terminal device acquiring the image by reading, from the image, the focal length of the lens used for photographing the image, the physical size of the pixel of the image sensor and the object distance of the photographed object in the image, thus actual use value of the image can be greatly improved.

Figure 3:
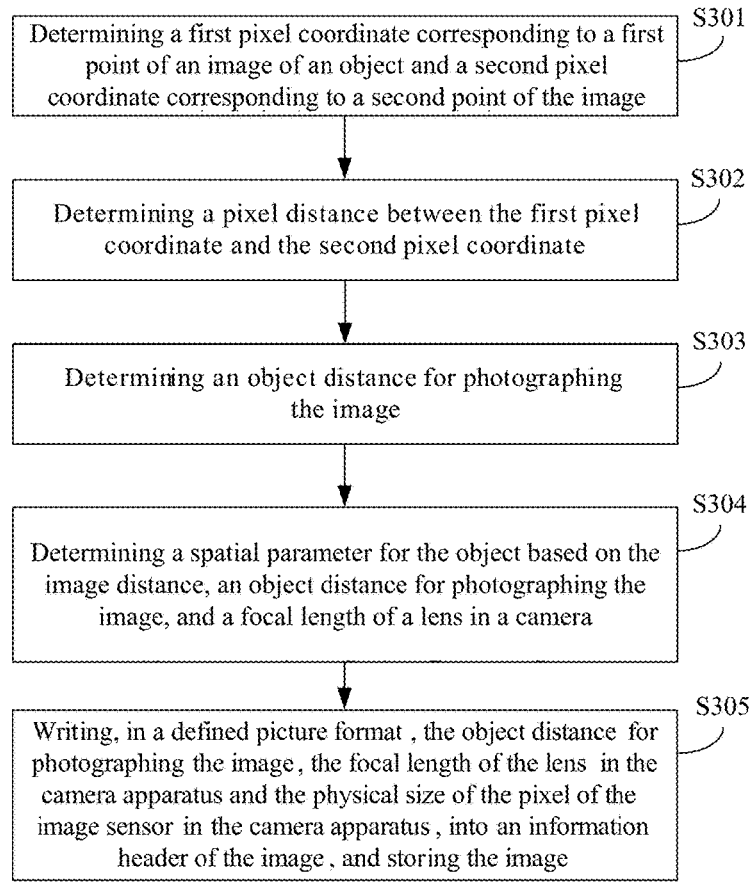
FIG. 3 is a flowchart illustrating a method for determining a spatial parameter by means of an image according to an exemplary embodiment II.

FIG. 3 is a flowchart illustrating a method for determining a spatial parameter based on an image according to an exemplary embodiment II. In this embodiment, an exemplary description of the foregoing method provided by the embodiments of the present disclosure is made with reference to FIG. 1B by taking an example in which the camera apparatus for photographing the image is disposed on the display device and the image is to be previewed on the display device. As shown in FIG. 3, the method includes the following steps.

In Step S301, a first pixel coordinate corresponding to a first point of the image displayed on the display device and a second pixel coordinate corresponding to a second point of the image are determined. Description of the Step S301 may be referred to the description of the foregoing Step S101, which is not detailed herein.

In Step S302, an image distance between the first pixel coordinate and the second pixel coordinate is determined. Description of the Step S302 may be referred to the description of the foregoing Step S102, which is not detailed any more herein.

In Step S303, an object distance for photographing the image is determined. In an embodiment, the object distance for photographing the image is determined based on a traveling time of infrared light transmitted by the display device. The traveling time is a time period between the time of sending infrared light and the time of receiving infrared light to and from the object. Based on the traveling time and a wavelength of the infrared light, the object distance is determined. In another embodiment, the object distance for photographing the image may be measured with a single camera or a double camera. Relevant method of distance measurement may be referred to related art, which is not detailed herein.

In Step S304, a spatial parameter for the object is determined according to the image distance, the object distance for photographing the image and the focal length of the lens in the camera apparatus used for photographing the image. Description of the Step S304 may be referred to the description of the foregoing Step S103, which is not detailed herein.

In Step S305, the object distance for photographing the image, the focal length of the lens in the camera apparatus and the physical size of the pixel in the image sensor of the camera apparatus are written, in a defined picture format, into an information header of the image, and the image is then stored.

In this embodiment, in addition to advantageous technical effects of the foregoing embodiments, the object distance for photographing the image, the focal length of the lens in the camera apparatus and the physical size of the pixel in the image sensor of the camera apparatus are written, in the defined picture format, into the information header of the image, such that relevant information for photographing the image can be read from the image by other terminal devices acquiring the image. In this way, the real size of the photographed object in the image can be directly learned, enabling more users to determine, based on the image, the real size of the photographed object in the image, thus the user experience can be improved.

Figure 4:
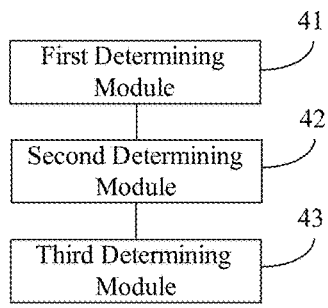
FIG. 4 is a block diagram illustrating an apparatus for determining a spatial parameter by means of an image according to an exemplary embodiment.

FIG. 4 is a block diagram illustrating an apparatus for determining a spatial parameter based on an image according to an exemplary embodiment, as shown in FIG. 4, the apparatus for determining a spatial parameter based on an image includes a first determining module 41, a second determining module 42, and a third determining module 43. The first determining module 41 is configured to determine a first pixel coordinate corresponding to a first position of an image and a second pixel coordinate corresponding to a second position of the image displayed on a display device. The second determining module 42 is configured to determine an image distance between the first pixel coordinate and the second pixel coordinate determined by the first determining module 41. The third determining module 43 is configured to determine a spatial parameter between the first pixel coordinate and the second pixel coordinate according to the image distance determined by the second determining module 42, an object distance upon photographing the image and a focal length of a lens in the camera apparatus for photographing the image.

Figure 5:
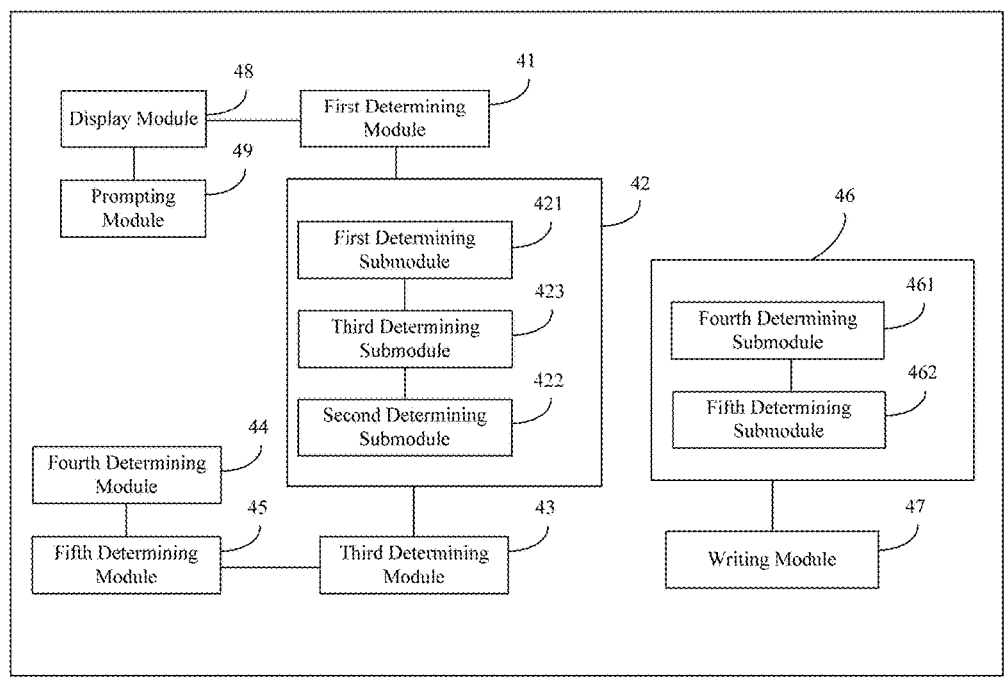
FIG. 5 is a block diagram illustrating another apparatus for determining a spatial parameter by means of an image according to an exemplary embodiment.

FIG. 5 is a block diagram illustrating another apparatus for determining a spatial parameter based on an image according to an exemplary embodiment. As shown in FIG. 5, on the basis of the embodiment as shown in FIG. 4, in an embodiment, the second determining module 42 includes a first determining submodule 421 configured to determine a pixel distance between the first pixel coordinate and the second pixel coordinate, a second determining submodule 422 configured to determine a physical size of a pixel in an image sensor of the camera apparatus, and a third determining submodule 423 configured to determine the image distance between the first pixel coordinate and the second pixel coordinate according to the pixel distance determined by the first determining submodule 421 and the physical size of the pixel determined by the second determining submodule 422.

In an embodiment, the apparatus may further include a fourth determining module 44 configured to determine a picture format of the image displayed on the display device when the camera apparatus for photographing the image is not disposed on the display device, and a fifth determining module 45 configured to determine, from an information header of the image according to the picture format determined by the fourth determining module 44, the object distance upon photographing the image, the focal length of the lens in the camera apparatus for photographing the image and the physical size of the pixel in the image sensor of the camera apparatus, so that the third determining submodule 43 is able to determine the spatial parameter between the first pixel coordinate and the second pixel coordinate according to the image distance determined by the second determining module 42, the object distance upon photographing the image determined by the fifth determining module 45 and the focal length of the lens in the camera apparatus for photographing the image.

In an embodiment, the apparatus may further include a sixth determining module 46 configured to determine the object distance upon photographing the image when the camera apparatus for photographing the image is disposed on the display device, and a writing module 47 configured to write, in a defined picture format, the object distance upon photographing the image determined by the sixth determining module 46, the focal length of the lens in the camera apparatus and the physical size of the pixel in the image sensor of the camera apparatus into the information header of the image.

In an embodiment, the sixth determining module 46 may include a fourth determining submodule 461 configured to determine a time span between transmission and reception of infrared light with an infrared apparatus disposed on the display device, and a fifth determining submodule 462 configured to determine the object distance according to the time span determined by the fourth determining submodule 461 and a wavelength of the infrared light.

In an embodiment, the apparatus may further include a display module 48 configured to display, on the display device and in a preset shape, the first pixel coordinate and the second pixel coordinate determined by the first determining module 41, and a prompting module 49 configured to generate a prompt, with the preset shape displayed by the display module 48, about whether to adjust the first pixel coordinate and the second pixel coordinate.

With regard to the apparatus in the foregoing embodiments, detailed description of specific modes for conducting operation of modules has been made in the embodiments related to the method, and no detailed illustration will be made herein.

Figure 6:
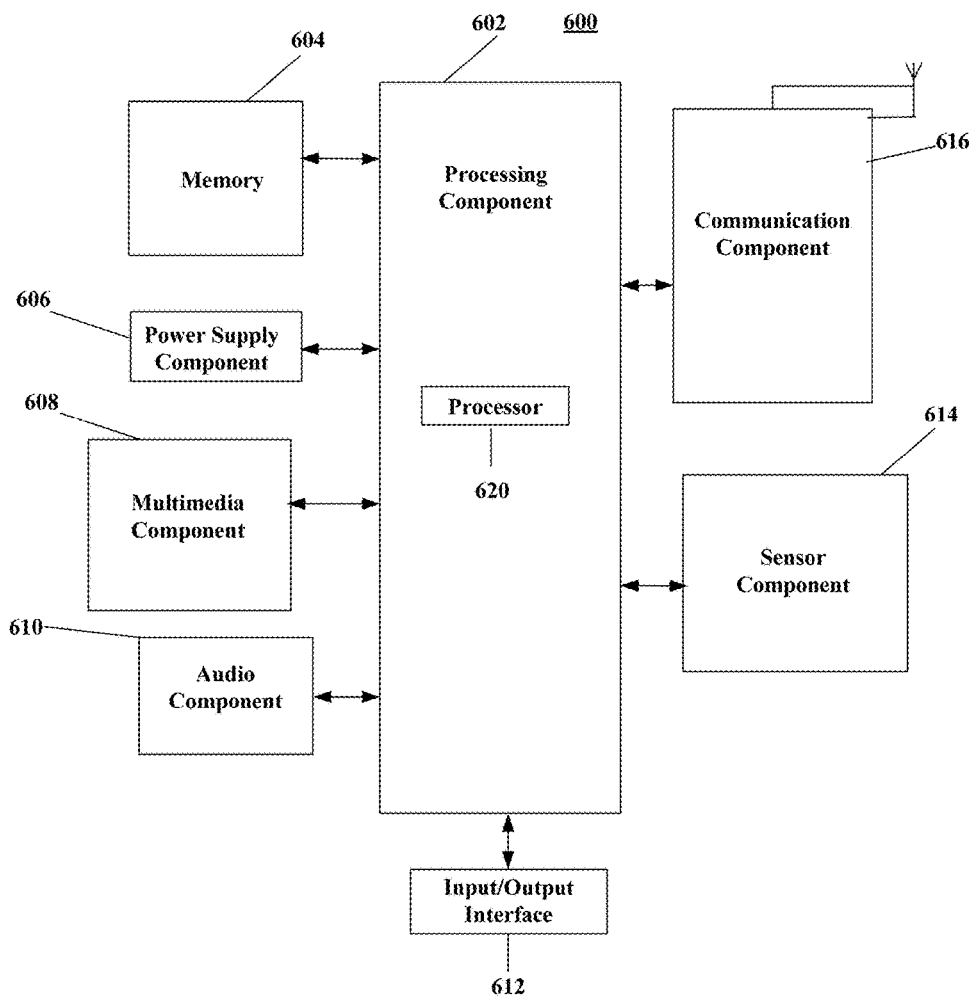
FIG. 6 is a block diagram illustrating an applicable terminal device according to an exemplary embodiment.

FIG. 6 is a block diagram illustrating an applicable terminal device according to an exemplary embodiment. For example, the terminal device 600 may be a mobile telephone, a computer, a digital broadcasting terminal, a message transceiver device, a games console, a tablet device, a medical device, a fitness facility, a personal digital assistant and the like.

Referring to FIG. 6, the terminal device 600 may include one or more components as below: a processing component 602, a memory 604, a power supply component 606, a multimedia component 608, an audio component 610, an input/output (I/O) interface 612, a sensor component 614 and a communications component 616.

The processing component 602 generally controls the overall operation of the terminal device 600, for example, display, telephone call, data communications, and operation associated with camera operation and record operation. The processing component 602 may include one or more processors 620 for executing instructions so as to complete steps of the foregoing method in part or in whole. In addition, the processing component 602 may include one or more modules for the convenience of interaction between the processing component 602 and other components. For example, the processing component 602 may include a multimedia module for the convenience of interaction between the multimedia component 608 and the processing component 602.

The memory 604 is configured to store various types of data so as to support the operation of the terminal device 600. Examples of the data include instructions of any application program or method operated on the terminal device 600, contact data, phonebook data, a message, a picture and a video, etc. The memory 604 may be implemented by any type of volatile or non-volatile memory device or a combination thereof, for example, a static random access memory (SRAM), an electrically erasable programmable read-only memory (EEPROM), an erasable programmable read only memory (EPROM), a programmable read-only memory (PROM), a read-only memory (ROM), a magnetic memory, a flash memory, a magnetic disk or an optical disk.

The power supply component 606 provides power for components of the terminal device 600. The power supply component 606 may include a power management system, one or more power supplies, and other components associated with generation, management and power distribution of the terminal device 600.

The multimedia component 608 includes a screen between the terminal device 600 and a user for providing an output interface. In some embodiments, the screen may include a liquid crystal display (LCD) and a touch panel (TP). If the screen includes the touch panel, the screen may be implemented as a touch screen for receiving an input signal from the user. The touch panel includes one or more touch sensors for sensing touching, sliding and gestures on the touch panel. The touch sensor can not only sense a boundary of a touch or slide, but also detect the time duration and pressure related to the touch or slide operation. In some embodiments, the multimedia component 608 includes a front-facing camera and/or a rear-facing camera. When the terminal device 600 is in an operation mode, for example, a shooting mode or a video mode, the front-facing camera and/or the rear-facing camera may receive external multimedia data. Each front-facing camera and rear-facing camera may be a fixed optical lens system or have a focal length and optical zoom capability.

The audio component 610 is configured to output and/or input an audio signal. For example, the audio component 610 includes a microphone (MIC); when the terminal device 600 is in an operation mode such as a call mode, a record mode and a speech recognition mode, the microphone is configured to receive an external audio signal. The received audio signal may be further stored in the memory 604 or sent out by the communications component 616. In some embodiments, the audio component 610 also includes a loudspeaker for outputting an audio signal.

The I/O interface 612 provides an interface for the processing component 602 and a peripheral interface module, and the peripheral interface module may be a keyboard, a click wheel and buttons, etc. These buttons may include but are not limited to: a home button, a volume button, a start button and a lock button.

The sensor component 614 includes one or more sensors for providing the terminal device 600 with a state evaluation from all aspects. For example, the sensor component 614 may detect the on/off state of the terminal device 600, relative positioning of components, for example, the components are the displayer and keypads of the terminal device 600; the sensor component 614 also may detect the position change of the terminal device 600 or a component thereof, the presence or absence of the user's touch on the terminal device 600, the direction or acceleration/deceleration of the terminal device 600, and temperature variation of the terminal device 600. The sensor component 614 may also include a proximity detector, which is configured to detect the presence of a nearby object in case of no physical contact. The sensor component 614 may also include an optical sensor, for example, a CMOS or CCD image sensor, used in the application of imaging. In some embodiments, the sensor component 614 may also include an acceleration sensor, a gyro sensor, a magnetic sensor, a pressure sensor, or a temperature sensor.

The communications component 616 is configured to facilitate wired communications or wireless communications between the terminal device 600 and other devices.

The terminal device 600 is available for access to a wireless network based on communications standards such as WiFi, 2G or 3G, or a combination thereof. In an exemplary embodiment, the communications component 616 receives, by means of a broadcast channel, a broadcast signal or broadcast-related information from an external broadcast management system. In an exemplary embodiment, the communications component 616 also includes a near field communication (NFC) module to promote short-range communications. For example, the NFC module may be implemented on the basis of Radio Frequency Identification (RFID) Technology, Infrared Data Association (IrDA) Technology, Ultra-wide Bandwidth (UWB) Technology, Bluetooth (BT) Technology and other technologies.

In an exemplary embodiment, the terminal device 600 may be implemented by one or more application specific integrated circuits (ASIC), digital signal processors (DSP), digital signal processing devices (DSPD), programmable logic devices (PLD), field programmable gate arrays (FPGA), controllers, microcontrollers, microprocessors or other electronic components to execute the foregoing method.

In an exemplary embodiment, a non-transitory computer-readable storage medium including an instruction is also provided, for example, the memory 604 including the instruction, and the foregoing instruction may be executed by the processor 620 of the terminal device 600 to achieve the foregoing method. For example, the non-transitory computer-readable storage medium may be a ROM, a random access memory (RAM), a CD-ROM, a magnetic tape, a floppy disk and an optical data storage device, etc.

Each module discussed above, such as the first determining module 41, a second determining module 42, and a third determining module 43, may take the form of a packaged functional hardware unit designed for use with other components, a portion of a program code (e.g., software or firmware) executable by the processor or the processing circuitry that usually performs a particular function of related functions, or a self-contained hardware or software component that interfaces with a larger system, for example Other embodiments of the present disclosure will be apparent to those skilled in the art from consideration of the specification and practice of the present disclosure disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for determining an actual distance between two points of an image of an object displayed on a device, comprising:
   photographing the object and creating the image of the object by the device;
   measuring an object distance between the object and an imaging element of the device, and inserting the object distance into an information header of the image of the object;
   measuring a focal length of a lens in the imaging element of the device, and inserting the focal length into the information header of the image of the object;
   measuring a physical size of a pixel for the imaging element of the device, and inserting the physical size of the pixel into the information header of the image of the object;
   receiving a user's indication of a first point of the image of the object on a user interface of the device;
   converting the user's indication of the first point of the image of the object into a first pixel coordinate on the image;
   receiving a user's indication of a second point of the image of the object on the user interface of the device;
   converting the user's indication of the second point of the image of the object into a second pixel coordinate on the image;
   determining a pixel distance between the first pixel coordinate and the second pixel coordinate;
   determining, from the information header of the image, the object distance between the object and the imaging element of the device, the focal length of the lens in the imaging element of the device, and the physical size of the pixel for the imaging element of the device;
   determining an image distance between the first pixel coordinate and the second pixel coordinate according to the pixel distance and the physical size of the pixel; and
   determining the actual distance between the first point and the second point of the image of the object based on the image distance, the object distance, and the focal length.

2. The method of claim 1, further comprising:
   writing, in a defined picture format, the object distance between the imaging element of the device and the object, and the physical size of the pixel for the imaging element of the device into the information header of the image.

3. The method of claim 1, wherein measuring the object distance between the imaging element of the device and the object comprises:
   determining a traveling time of infrared light between the imaging element of the device and the object, the infrared light being generated by the device; and
   determining the object distance between the imaging element of the device and the object based on the traveling time and a wavelength of the infrared light.

4. The method of claim 1, further comprising:
   displaying, on the device, the first pixel coordinate and the second pixel coordinate in a preset shape; and
   displaying a prompt for adjusting a location of the first pixel coordinate or the second pixel coordinate.

5. A terminal device for determining an actual distance between two points of an image an object displayed thereon, comprising:
   a processor;
   a memory configured to store instructions executable by the processor,
   wherein, the processor is configured to perform:
   receiving a user's indication of a first point of the image of the object on a user interface of the terminal device;
   converting the user's indication of the first point of the image of the object into a first pixel coordinate on the image;

receiving a user's indication of a second point of the image of the object on the user interface of the terminal device;

converting the user's indication of the second point of the image of the object into a second pixel coordinate on the image;

determining a pixel distance between the first pixel coordinate and the second pixel coordinate;

determining, from an information header of the image, an object distance between the object and an imaging element of a photographing device, a focal length of a lens in the imaging element of the photographing device, and a physical size of a pixel for the imaging element of the photographing device, wherein the object distance, the focal length, and the physical size of the pixel were measured by the photographing device and inserted into the information header of the image when the object was photographed;

determining an image distance between the first pixel coordinate and the second pixel coordinate according to the pixel distance and the physical size of the pixel; and determining the actual distance between the first point and the second point of the image of the object displayed on the terminal device based on the image distance, the object distance, and the focal length.

6. The terminal device of claim 5, wherein the processor is further configured to perform:

writing, in a defined picture format, the object distance between the imaging element of the terminal device and the object, and the physical size of the pixel for the imaging element of the terminal device into the information header of the image.

7. The terminal device of claim 6, wherein determining the object distance between the imaging element of the terminal device and the object comprises:

determining a traveling time of infrared light between the imaging element of the terminal device and the object, the infrared light being generated by the terminal device; and determining the object distance between the imaging element of the terminal device and the object based on the traveling time and a wavelength of the infrared light.

8. The terminal device of claim 5, wherein the processor is further configured to perform:

displaying, on the terminal device, the first pixel coordinate and the second pixel coordinate in a preset shape; and displaying a prompt for adjusting a location of the first pixel coordinate or the second pixel coordinate.

9. The terminal device of claim 5, wherein the processor is further configured to perform:

displaying the actual distance between two points of the image of the object along with the image of the object on the terminal device.

10. A non-transitory computer-readable storage medium having stored therein instructions that, when executed by a processor of a terminal device, causes the terminal device to perform a method for determining an actual distance between two points of an image of an object displayed on the terminal device, the method comprising:

photographing the object and creating the image of the object by the terminal device;

measuring an object distance between the object and an imaging element of the terminal device, and inserting the object distance into an information header of the image of the object;

measuring a focal length of a lens in the imaging element of the terminal device, and inserting the focal length into the information header of the image of the object;

measuring a physical size of a pixel for the imaging element of the terminal device, and inserting the physical size of the pixel into the information header of the image of the object;

receiving a user's indication of a first point of the image of the object on a user interface of the terminal device;

converting the user's indication of the first point of the image of the object into a first pixel coordinate on the image;

receiving a user's indication of a second point of the image of the object on the user interface of the terminal device;

converting the user's indication of the second point of the image of the object into a second pixel coordinate on the image;

determining a pixel distance between the first pixel coordinate and the second pixel coordinate;

determining, from the information header of the image, the object distance between the object and the imaging element of the terminal device, the focal length of the lens in the imaging element of the terminal device, and the physical size of the pixel for the imaging element of the terminal device;

determining an image distance between the first pixel coordinate and the second pixel coordinate according to the pixel distance and the physical size of the pixel; and determining the actual distance between the first point and the second point of the image of the object displayed on the terminal device based on the image distance, the object distance, and the focal length.

* * * * *

UNITED STATES PATENT AND TRADEMARK OFFICE
CERTIFICATE OF CORRECTION

PATENT NO. : 10,101,156 B2  
APPLICATION NO. : 15/149960  
DATED : October 16, 2018  
INVENTOR(S) : Guosheng Li et al.

Page 1 of 1

It is certified that error appears in the above-identified patent and that said Letters Patent is hereby corrected as shown below:

In the Claims

In Column 12, Claim 5, Line 57, insert after "Image" --of--.

Signed and Sealed this  
Third Day of March, 2020

Andrei Iancu  
*Director of the United States Patent and Trademark Office*